(12) United States Patent
Lang

(10) Patent No.: US 11,812,214 B2
(45) Date of Patent: Nov. 7, 2023

(54) COMMUNICATION CONTROL METHOD, APPARATUS AND SYSTEM, CHARGING CASE AND WIRELESS EARPHONE

(71) Applicant: GOERTEK INC., Shandong (CN)

(72) Inventor: Yunsen Lang, Shandong (CN)

(73) Assignee: GOERTEK INC., Shandong (CN)

( * ) Notice: Subject to any disclaimer, the term of this patent is extended or adjusted under 35 U.S.C. 154(b) by 90 days.

(21) Appl. No.: 17/616,324

(22) PCT Filed: Sep. 29, 2019

(86) PCT No.: PCT/CN2019/108945
§ 371 (c)(1),
(2) Date: Dec. 3, 2021

(87) PCT Pub. No.: WO2021/031296
PCT Pub. Date: Feb. 25, 2021

(65) Prior Publication Data
US 2022/0329927 A1  Oct. 13, 2022

(30) Foreign Application Priority Data
Aug. 16, 2019 (CN) .......................... 201910758772.4

(51) Int. Cl.
*H04R 1/10* (2006.01)
*G06F 3/16* (2006.01)

(52) U.S. Cl.
CPC ........... *H04R 1/1041* (2013.01); *G06F 3/162* (2013.01); *G06F 3/165* (2013.01); *H04R 1/1025* (2013.01);
(Continued)

(58) Field of Classification Search
CPC ................ H04R 1/1041; H04R 1/1025; H04R 2420/03; H04R 2460/17; G06F 3/162; G06F 3/165; H02J 50/80
See application file for complete search history.

(56) References Cited

U.S. PATENT DOCUMENTS 11,564,028 B2 * 1/2023 Chen .................... H04R 1/1025
2015/0249356 A1  9/2015 Cho et al.
(Continued)

FOREIGN PATENT DOCUMENTS

CN   107887950   4/2018
CN   108495224   9/2018
(Continued)

OTHER PUBLICATIONS

International Search Report issued in PCT/CN2019/108945 dated May 18, 2020.

*Primary Examiner* — Jason R Kurr
(74) *Attorney, Agent, or Firm* — HAUPTMAN HAM, LLP

(57) ABSTRACT

Disclosed are a communication control method, apparatus and system, and a charging case and a wireless earphone. The method includes: acquiring, when a charging case is connected with a first wireless earphone though a first power supply pin and a second power supply pin, first to-be-transmitted data if the charging case is to communicate with the first wireless earphone; and controlling a first single-pole double-throw switch to connect the first power supply pin with a first TxRx and level conversion circuit, sequentially transmitting a predetermined start code and the first to-be-transmitted data to the first wireless earphone through the first power supply pin, where the first wireless earphone controls a first predetermined charging pin to be connected with a second TxRx and level conversion circuit based on the predetermined start code, and receives the first to-be-transmitted data.

8 Claims, 9 Drawing Sheets

(52) U.S. Cl.
CPC ...... *H04R 2420/03* (2013.01); *H04R 2460/17* (2013.01)

(56) References Cited

U.S. PATENT DOCUMENTS

| | | | |
|---|---|---|---|
| 2017/0094399 A1* | 3/2017 | Chandramohan | H04B 5/0037 |
| 2019/0201245 A1* | 7/2019 | Albean | H04R 1/1016 |
| 2020/0107174 A1 | 4/2020 | Tong et al. | |
| 2020/0127482 A1* | 4/2020 | Ding | H02J 7/007194 |
| 2022/0086553 A1* | 3/2022 | Shan | H02J 50/80 |

FOREIGN PATENT DOCUMENTS

| | | |
|---|---|---|
| CN | 109495807 | 3/2019 |
| CN | 109547884 | 3/2019 |
| CN | 109638911 | 4/2019 |
| CN | 209234010 | 8/2019 |
| EP | 2390969 | 11/2011 |

\* cited by examiner ic # COMMUNICATION CONTROL METHOD, APPARATUS AND SYSTEM, CHARGING CASE AND WIRELESS EARPHONE The present application is a 371 Application of International Patent Application No. PCT/CN2019/108945, titled "COMMUNICATION CONTROL METHOD, APPARATUS AND SYSTEM, CHARGING CASE AND WIRELESS EARPHONE", and filed on Sep. 29, 2019, which claims the benefit of and priority to Chinese Patent Application No. 201910758772.4, titled "COMMUNICATION CONTROL METHOD, APPARATUS AND SYSTEM, CHARGING CASE AND WIRELESS EARPHONE", filed on Aug. 16, 2019 with the Chinese Patent Office, both of which are incorporated herein by reference in their entireties.

FIELD

The present disclosure relates to the technical field of portable listening devices, and in particular to a communication control method, a communication control device, a communication control system, a charging case and a wireless earphone.

BACKGROUND

The conventional earphones include wired earphones and wireless earphones. The wired earphones include a left earphone and a right earphone which are connected with each other in a wired manner to provide a left sound channel and a right sound channel, for achieving a stereo effect. However, it is inconvenient to wear the wired earphones. The wireless earphones communicate with a terminal through a wireless communication protocol (such as Bluetooth). Compared with the wired earphones, the wireless earphones have no data line to be handled, and therefore are convenient to use. The latest stereo Bluetooth earphones (TWS earphones), which are genuinely wireless, are typical wireless earphones. The wireless earphones such as the TWS earphones are generally equipped with a charging case for charging the wireless earphones. The charging case further communicates with the wireless earphones to pair the wireless earphones, restore the factory setting (reset), and perform other operations.

At present, most wireless earphones and charging cases on the market are connected through 3-pin contacts for implementing charging and communication functions, and a minority of products adopt 2-pin contacts for same functions. In the conventional technology, connection through 2-pin contacts is realized in the following two manners. In a first manner, a special communication chip (such as a special chip from AMS or Maxim) is additionally provided for the charging and communication functions between the wireless earphones and the charging case. However, the special chip, which is expensive and has a limited communication rate, is not widely used and is less competitive when facing customer demands. In a second manner, a special CPLD (programmable logic device) or a processor (such as a single-chip microcomputer) controlling an external single-pole double-throw switch is adopted for controlling communication and transmitting states such as charging. This manner, however, is limited by high cost and poor product stability, and cannot meet customer demands in the front-end market.

Therefore, how to implement the charging and communication functions between the wireless earphone and the charging case in a simple and efficient manner, to reduce development difficulty of engineers, lower the material cost of the product, and to improve stability and reliability of the product is a problem required to be solved urgently.

SUMMARY

A communication control method, a communication control device, a communication control system, a charging case and a wireless earphone are provided according to the present disclosure to implement the charging and communication functions between the wireless earphone and the charging case in a simple and efficient manner.

In order to solve the above technical problem, a communication control method is provided according to the present disclosure. The method includes:
  acquiring, when a charging case is connected with a first wireless earphone though a first power supply pin and a second power supply pin, first to-be-transmitted data if the charging case is to communicate with the first wireless earphone; and
  controlling a first single-pole double-throw switch to connect the first power supply pin with a first TxRx and level conversion circuit, sequentially transmitting a predetermined start code and the first to-be-transmitted data to the first wireless earphone through the first power supply pin, where the first wireless earphone controls a first predetermined charging pin to be connected with a second TxRx and level conversion circuit based on the predetermined start code, and receives the first to-be-transmitted data, the first predetermined charging pin being in the first wireless earphone and being connected with the first power supply pin.

In an embodiment, the sequentially transmitting a predetermined start code and the first to-be-transmitted data to the first wireless earphone through the first power supply pin includes:
  sequentially transmitting the predetermined start code, the first to-be-transmitted data and a predetermined end code to the first wireless earphone through the first power supply pin.

In an embodiment, after the sequentially transmitting a predetermined start code and the first to-be-transmitted data to the first wireless earphone through the first power supply pin, the method further includes:
  determining whether back data transmitted by the first wireless earphone through the first power supply pin is received within a predetermined time period; and
  controlling, if the back data is not received within the predetermined time period, the first single-pole double-throw switch to connect the first power supply pin with the power supply circuit to supply power to the first wireless earphone.

In an embodiment, the method further includes:
  acquiring a reset instruction for the first wireless earphone; and
  controlling the first single-pole double-throw switch to connect the first power supply pin and the power supply circuit and controlling the power supply circuit to output a reset signal, to cause the first wireless earphone to reset based on a voltage signal.

In an embodiment, the method further includes:
  acquiring, when the charging case is connected with a second wireless earphone though a third power supply pin and a fourth power supply pin, second to-be-transmitted data if the charging case is to communicate with the second wireless earphone; and controlling a second single-pole double-throw switch to connect a third power supply pin with a third TxRx and level conversion circuit, sequentially transmitting the predetermined start code and the second to-be-transmitted data to the second wireless earphone through the third power supply pin, where the second wireless earphone controls a second predetermined charging pin to be connected with a fourth TxRx and level conversion circuit based on the predetermined start code to receive the second to-be-transmitted data, the second predetermined charging pin being in the second wireless earphone and being connected with the third power supply pin.

In an embodiment, the method further includes:

when the charging case is connected with the first wireless earphone through the first power supply pin and the second power supply pin: controlling, at predetermined intervals, the first single-pole double-throw switch to connect the first power supply pin with the first TxRx and level conversion circuit; and transmitting, at the predetermined intervals, the predetermined start code to the first wireless earphone through the first power supply pin.

A communication control device is further provided according to the present disclosure. The device includes an acquisition module and a transmission control module.

The acquisition module is configured to acquire, when a charging case is connected with a first wireless earphone though a first power supply pin and a second power supply pin, first to-be-transmitted data if the charging case is to communicate with the first wireless earphone; and The transmission control module is configured to control a first single-pole double-throw switch to connect the first power supply pin with a first TxRx and level conversion circuit and sequentially transmit a predetermined start code and the first to-be-transmitted data to the first wireless earphone through the first power supply pin, where the first wireless earphone controls a first predetermined charging pin to be connected with a second TxRx and level conversion circuit based on the predetermined start code to receive the first to-be-transmitted data, the first predetermined charging pin being in the first wireless earphone and being connected with the first power supply pin.

A charging case is further provided according to the present disclosure. The charging case includes a processor, a power supply circuit, a TxRx and level conversion circuit, a single-pole double-throw switch, a first power supply pin and a second power supply pin.

A Tx terminal and an Rx terminal of the processor are respectively connected with a Tx input terminal and an Rx output terminal of the TxRx and level conversion circuit, for outputting data and receiving data. A first stationary contact of the single-pole double-throw switch is connected with an output terminal of the power supply circuit. A second stationary contact of the single-pole double-throw switch is connected with a Tx output terminal and an Rx input terminal of the TxRx and level conversion circuit. A movable contact of the single-pole double-throw switch is connected with the first power supply pin. The second power supply pin is grounded. A control terminal of the single-pole double-throw switch is connected with the processor, and is configured to control the movable contact to be connected with one of the first stationary contact and the second stationary contact under control of the processor.

A communication control method is further provided according to the present disclosure. The method includes:

detecting by a wireless earphone, voltage information of a predetermined charging pin;

determining whether the voltage information is a predetermined start code;

in a case that the voltage information is the predetermined start code, controlling a single-pole double-throw switch to connect the predetermined charging pin with the TxRx and level conversion circuit and receiving data transmitted by a charging case through the predetermined charging pin; and controlling, after the data is completely received, the single-pole double-throw switch to connect the predetermined charging pin with the charging circuit.

In an embodiment, before the controlling the single-pole double-throw switch to connect the predetermined charging pin with the charging circuit, the method further includes:

transmitting, if back data is to be transmitted to the charging case, the back data to the charging case through the predetermined charging pin.

A communication control device is further provided according to the present disclosure. The device includes a detection module, a determination module, a reception control module, and a charging control module.

The detection module is configured to detect voltage information of a predetermined charging pin.

The determination module is configured to determine whether the voltage information is a predetermined start code.

The reception control module is configured to, in a case that the voltage information is the predetermined start code, control a single-pole double-throw switch to connect the predetermined charging pin with the TxRx and level conversion circuit and receive data transmitted by a charging case through the predetermined charging pin.

The charging control module is configured to control, after the data is completely received, the single-pole double-throw switch to connect the predetermined charging pin with the charging circuit.

A wireless earphone is provided according to the present disclosure. The wireless earphone includes a processor, a charging circuit, a TxRx and level conversion circuit, a single-pole double-throw switch, a first charging pin and a second charging pin.

A Tx terminal and an Rx terminal of the processor are respectively connected with a Tx input terminal and an Rx output terminal of the TxRx and level conversion circuit, for outputting data and receiving data. A voltage detection terminal of the processor is connected with the first charging pin to detect a voltage of the first charging pin. A first stationary contact of the single-pole double-throw switch is connected with an input terminal of the charging circuit. A second stationary contact of the single-pole double-throw switch is connected with an Tx output terminal and an Rx input terminal of the TxRx and level conversion circuit. A movable contact of the single-pole double-throw switch is connected with the first charging pin. The second charging pin is grounded. A control terminal of the single-pole double-throw switch is connected with the processor, and is configured to control the movable contact to be connected with one of the first stationary contact and the second stationary contact under control of the processor.

In an embodiment, the wireless earphone further includes a reset chip.

The reset chip is connected with the first charging pin and the processor; and the reset chip is configured to transmit, when determining that voltage information of the first charging pin is a reset signal, a reset instruction to the processor to control the processor to reset.

A communication control system is provided according to the present disclosure.

The system includes the above charging case and the above wireless earphone.

The communication control method according to the present disclosure includes: acquiring, when a charging case is connected with a first wireless earphone though a first power supply pin and a second power supply pin, first to-be-transmitted data if the charging case is to communicate with the first wireless earphone; and controlling a first single-pole double-throw switch to connect the first power supply pin with a first TxRx and level conversion circuit, sequentially transmitting a predetermined start code and the first to-be-transmitted data to the first wireless earphone through the first power supply pin, where the first wireless earphone controls a first predetermined charging pin to be connected with a second TxRx and level conversion circuit based on the predetermined start code, and receives the first to-be-transmitted data, the first predetermined charging pin being in the first wireless earphone and being connected with the first power supply pin.

In the present disclosure, with the communication control method in which the predetermined start code and the first to-be-transmitted data are sequentially transmitted, the wireless earphone switches between being charged by the charging case and communicating with charging case. The charging and communication functions between the wireless earphone and the charging case are implemented in a simple and efficient manner based on simple circuits, which reduces development difficulty of the engineer. In addition, no additional communication chip or control device is required, reducing material cost of the product and improving stability and reliability of the product. In addition, a communication control device, a communication control system, a charging case and a wireless earphone are further provided according to the present disclosure, which have the beneficial effects described above.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing the embodiments of the present disclosure, and those skilled in the art may obtain other drawings according to the provided drawings without any creative effort.

DETAILED DESCRIPTION OF EMBODIMENTS

In order to make the objective, the technical solutions and advantages of the embodiments of the present disclosure clear, technical solutions of embodiments of the present disclosure are described below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Figure 1:
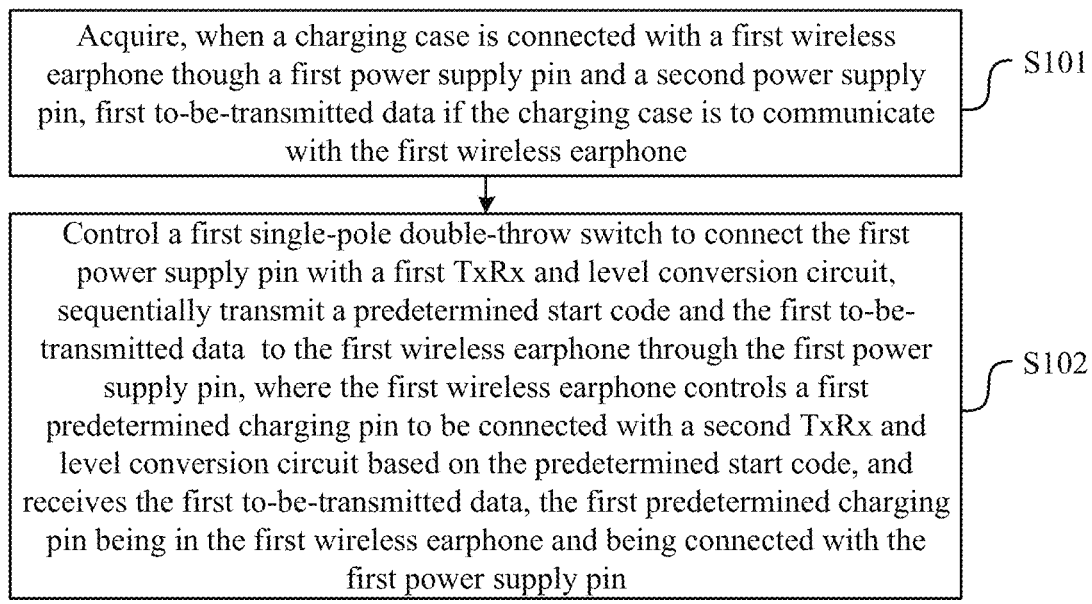
FIG. 1 is a flowchart of a communication control method according to an embodiment of the present disclosure.

Referring to FIG. 1, which is a flowchart of a communication control method according to an embodiment of the present disclosure, the method includes the following steps 101 and 102.

In step 101, when a charging case is connected with a first wireless earphone though a first power supply pin and a second power supply pin, first to-be-transmitted data is acquired if the charging case is to communicate with the first wireless earphone.

Figure 2:
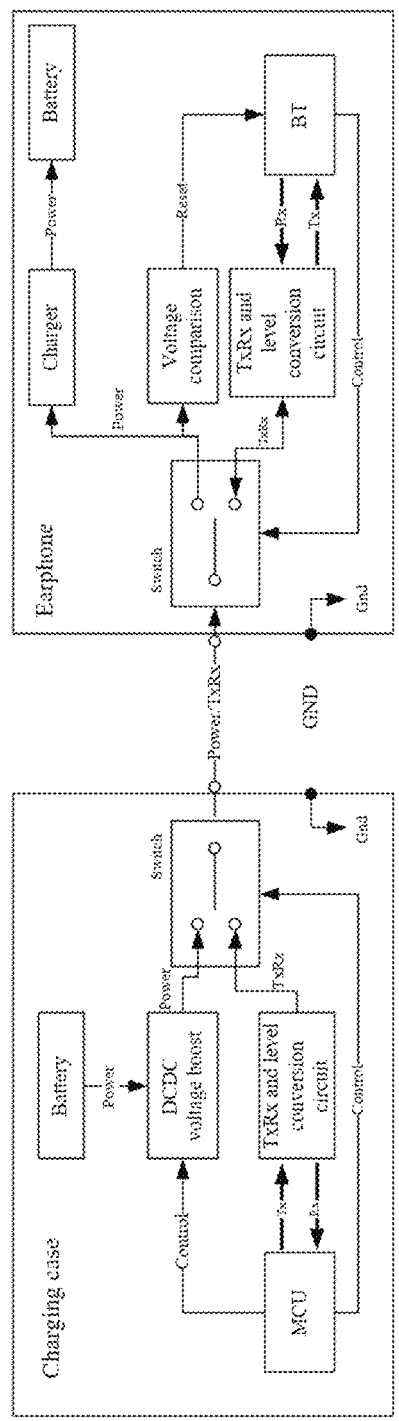
FIG. 2 is a schematic structural diagram of a communication control system according to an embodiment of the present disclosure.

In this step, the first power supply pin and the second power supply pin may be two contacts that are arranged in the charging case and configured to be connected with two charging pins of a wireless earphone to supply power to the wireless earphone. For example, the first power supply pin and the second power supply pin may be a Power/TxRx contact and a GND contact in the charging case as shown in FIG. 2.

It should be noted that the first wireless earphone in this step may be an earphone (such as a TWS earphone) having two charging pins that are respectively connected with the first power supply pin and the second power supply pin of the charging case. The first to-be-transmitted data in this step may be data that is acquired by a processor in the charging case such as a single-chip microcomputer and that is to be transmitted to the first wireless head set when the first wireless earphone is put into the charging case. The first to-be-transmitted data may be determined by a designer. For example, the first to-be-transmitted data may be power data of the charging case including a check bit. For example, each time when the processor in the charging case detects that the first wireless earphone is put into the charging case, the power data of the charging case may be acquired and transmitted to the first wireless earphone to inform the first wireless earphone whether the charging case is capable of charging the first wireless earphone. The first to-be-transmitted data may alternatively be instruction data for controlling the first wireless earphone to feed data back to the charging case or perform an operation in responsive to the first data. For example, the user may operate a button on the charging case to control the processor of the charging case to generate instruction data corresponding to an instruction for controlling the first wireless earphone to enter a pairing state. The first to-be-transmitted data is not limited in the embodiment.

It can be understood that a manner in which the processor acquires the first to-be-transmitted data in this step may be set by the designer according to a application scenario and user demands. For example, a sensor may be used to detect whether the first wireless earphone is put into the charging case, that is, whether the first power supply pin and the second power supply pin in the charging case are connected with the wireless earphone. If the first wireless earphone is put into the charging case, the first to-be-transmitted data that is to be transmitted to the first wireless earphone through step 102 is acquired. For example, the processor in the charging case determines whether the first wireless earphone is put into the charging case by using detection data of a sensor such as a Hall sensor or a distance sensor (P_Sensor). The processor in the charging case may alternatively acquire the first to-be-transmitted data that is to be transmitted to the first wireless earphone, and then determine whether the first wireless earphone is put into the charging case, and step 102 is performed if the first wireless earphone is put into the charging case. The manner in which the processor acquires the first to-be-transmitted data is not limited in the embodiment.

In step 102, a first single-pole double-throw switch is controlled to connect the first power supply pin with a first TxRx and level conversion circuit, and a predetermined start code and the first to-be-transmitted data are sequentially transmitted to the first wireless earphone through the first power supply pin. The first wireless earphone controls a first predetermined charging pin to be connected with a second TxRx and level conversion circuit based on the predetermined start code, and receives the first to-be-transmitted data. The first predetermined charging pin is arranged in the first wireless earphone and is connected with the first power supply pin.

It should be understood that the charging case in the embodiment is provided with a single-pole double-throw switch (the first single-pole double-throw switch). The single-pole double-throw switch has a movable contact that is connected with the first power supply pin and two stationary contacts that are respectively connected with an output terminal of a power supply circuit in the charge case and a TxRx and level conversion circuit (the first TxRx and level conversion circuit). A control terminal of the single-pole double-throw switch is connected with the processor in the charging case, so that the processor controls the switching of the single-pole double-throw switch.

In this step, the processor in the charging case controls the first single-pole and double-throw switch to connect the first power supply pin with the first TxRx and level conversion circuit, such that the charging case communicates with the first wireless earphone, and transmits data to the first wireless earphone and receives data from the first wireless earphone through the first TxRx and level conversion circuit and the first power supply pin. In this step, after the processor controls the first single-pole double-throw switch to connect the first power supply pin with the first TxRx and level conversion circuit, the predetermined start code and the first to-be-transmitted data are sequentially transmitted to the first wireless earphone. Based on detection of the predetermined start code, the first wireless earphone controls a single-pole double-throw switch in the first wireless earphone to connect the first predetermined charging pin and a second TxRx and level conversion circuit of the first wireless earphone, so that a processor (such as a Bluetooth chip) in the first wireless earphone receives subsequent first to-be-transmitted data through the first predetermined charging pin and the second TxRx and level conversion circuit, realizing data transmission from the charging case to the first wireless earphone.

The first TxRx and level conversion circuit in the charging case in this step may be connected with the processor in the charging case and one of the stationary contacts of the first single-pole double-throw switch. That is, an Rx (receive) input terminal and a Tx (transport) output terminal the first TxRx and level conversion circuit may be connected with the stationary contact. An Rx output terminal and a Tx input terminal of the first TxRx and level conversion circuit may be respectively connected with an Rx terminal and a Tx terminal of the processor, so that the predetermined start code and the first to-be-transmitted data that are sequentially outputted through the Tx terminal of the processor are transmitted to the first power supply pin sequentially through the Tx input terminal and the Tx output terminal of the first TxRx and level conversion circuit, and the stationary contact and the movable contact of the first single-pole double-throw switch. A circuit structure of the first TxRx and level conversion circuit may be set by the designer, for example, to have a structure that is the same as or similar to that of the conventional TxRx and level conversion circuit, as long as the processor in the charging case can transmit and receive data through the first TxRx and level conversion circuit. The circuit structure of the first TxRx and level conversion circuit is not limited in the embodiment.

It should be noted that the processor in the charging case in the embodiment controls the first wireless earphone to communicate with the charging case, that is, the first predetermined charging pin to be connected with the second TxRx and level conversion circuit, by transmitting the predetermined start code to the first wireless earphone. When the first wireless earphone communicates with the charging case, the connection between the Rx input terminal of the first TxRx and level conversion circuit and the Tx output terminal of the second TxRx and level conversion circuit, and the connection between the Tx output terminal of the first TxRx and level conversion circuit and the Rx input terminal of the second TxRx and level conversion circuit are realized through the connection between the first power supply pin and the first predetermined charging pin. Therefore, each of the charging case and the first wireless earphone cannot transmit data and receive data at the same time. In the embodiment, the charging case transmits the predetermined start code to inform the first wireless earphone to switch to a state of communicating with the charging case, and receive subsequent first to-be-transmitted data.

Correspondingly, in order that the charging case receives data transmitted by the first wireless earphone, the first wireless earphone may, after finishing receiving the first to-be-transmitted data, transmit back data such as power data of the earphone and an upgrade package for the charging case to the charging case through the second TxRx and level conversion circuit and the first predetermined charging pin. That is, after the first to-be-transmitted data is completely transmitted, the charging case does not immediately switch to a state of charging the first wireless earphone, that is, immediately control the first single-pole double-throw switch to connect the first power supply pin with the power supply circuit. Instead, the charging case determines whether the back data transmitted by the first wireless earphone through the first power supply pin is received within a predetermined time period. If the back data is received within the predetermined time period, the charging case switches to the state of charging the first wireless earphone after the back data is completely received. If the back data is not received within the predetermined time period, the charging case directly switches to the state of charging the first wireless earphone. That is, in this step, the processor of the charging case may determine whether the back data transmitted by the first wireless earphone through the first power supply pin is received within the predetermined time period after transmitting of the first to-be-transmitted data is completed, and controls the first single-pole double-throw switch to connect the first power supply pin with the power supply circuit to supply power to the first wireless earphone if the back data is not received within the predetermined time period.

In order to determine completion of data reception by the first wireless earphone and the charging case, in the embodiment, a predetermined end code may be transmitted after the charging case and the wireless earphone finish transmitting data, so that the receiver can determine completion of data reception based on the predetermined end code. For example, in this step, the processor may sequentially transmit the predetermined start code, the first to-be-transmitted data and the predetermined end code to the first wireless earphone through the first power supply pin. The predetermined start code and the predetermined end code in the embodiment may be set by the designer. For example, the predetermined start code may be a high level (such as 1.8 V or 3.3 V) with a certain width, and the predetermined end code may be a pulse of a high level or a low level with a certain width.

It should be understood that, in this embodiment, charging and communication functions between the charging case and one wireless earphone (the first wireless earphone) placed in the charging case are described as an example. Charging and communication functions between the charging case and the other wireless earphone (the second wireless earphone) placed in the charging case may be realized with a method the same as or similar to the method according to this embodiment. For example, the method according to the this embodiment may further include: acquiring, when a charging case is connected with a second wireless earphone though a third power supply pin and a fourth power supply pin, second to-be-transmitted data if the charging case is to communicate with the second wireless earphone; and controlling a second single-pole double-throw switch to connect the third power supply pin with a third TxRx and level conversion circuit, and sequentially transmitting the predetermined start code and the second to-be-transmitted data to the second wireless earphone through the third power supply pin, where the second wireless earphone controls a second predetermined charging pin to be connected with a fourth TxRx and level conversion circuit based on the predetermined start code and receives the second to-be-transmitted data, and the second predetermined charging pin is arranged in the second wireless earphone and is connected with the third power supply pin.

That is, the charging case may further be provided with the third power supply pin and the fourth power supply pin that are configured to be connected with the second wireless earphone, a corresponding power supply circuit, the third TxRx and level conversion circuit and the second single-pole double-throw switch, so as to charge the two wireless earphones and communicate with the two wireless earphones.

In the embodiment of the present disclosure, with the communication control method in which the predetermined start code and the first to-be-transmitted data are sequentially transmitted, the wireless earphone switches between being charged by the charging case and communicating with charging case. The charging and communication functions between the wireless earphone and the charging case are implemented in a simple and efficiency manner based on simple circuits, which reduces development difficulty of the engineer. In addition, no additional communication chip or control device is required, reducing material cost of the product and improving stability and reliability of the product.

Figure 3:
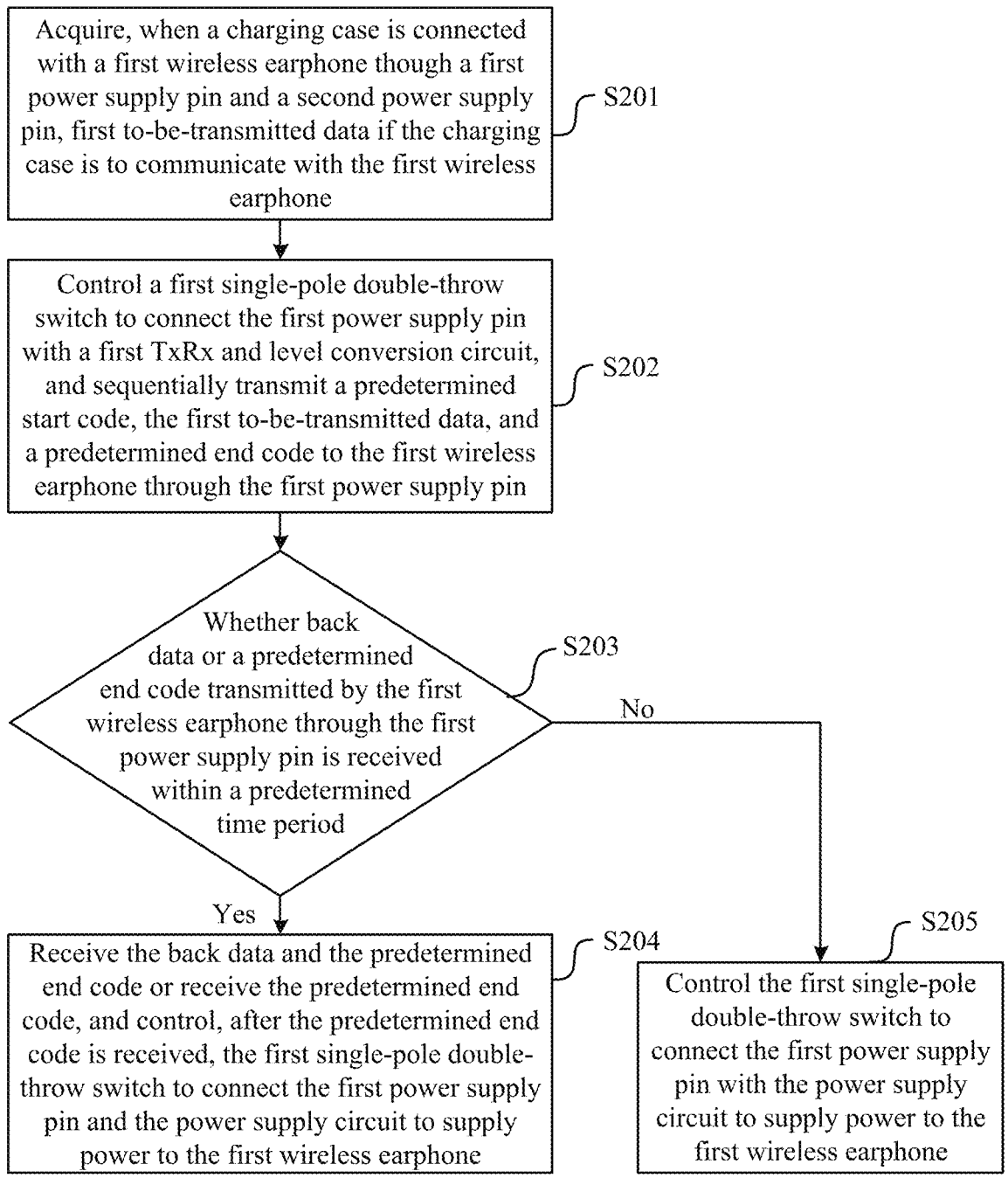
FIG. 3 is a flowchart of a communication control method according to another embodiment of the present disclosure.

Referring to FIG. 3, which is a flowchart of a communication control method according to another embodiment of the present disclosure, the method includes the following steps 201 to 205.

In step 201, when a charging case is connected with a first wireless earphone though a first power supply pin and a second power supply pin, the charging case acquires first to-be-transmitted data if the charging case is to communicate with the first wireless earphone.

This step is similar to step 101 and is not repeated herein.

In step 202, a first single-pole double-throw switch is controlled to connect the first power supply pin with a first TxRx and level conversion circuit, and a predetermined start code, the first to-be-transmitted data, and a predetermined end code are sequentially transmitted to the first wireless earphone through the first power supply pin.

It should be understood that in this step, the processor in the charging case informs the first wireless earphone that the first to-be-transmitted data is completely transmitted by transmitting the predetermined end code to the first wireless earphone, so that the first wireless earphone determines completion of reception of the first to-be-transmitted data on reception of the predetermined end code.

Figure 6:
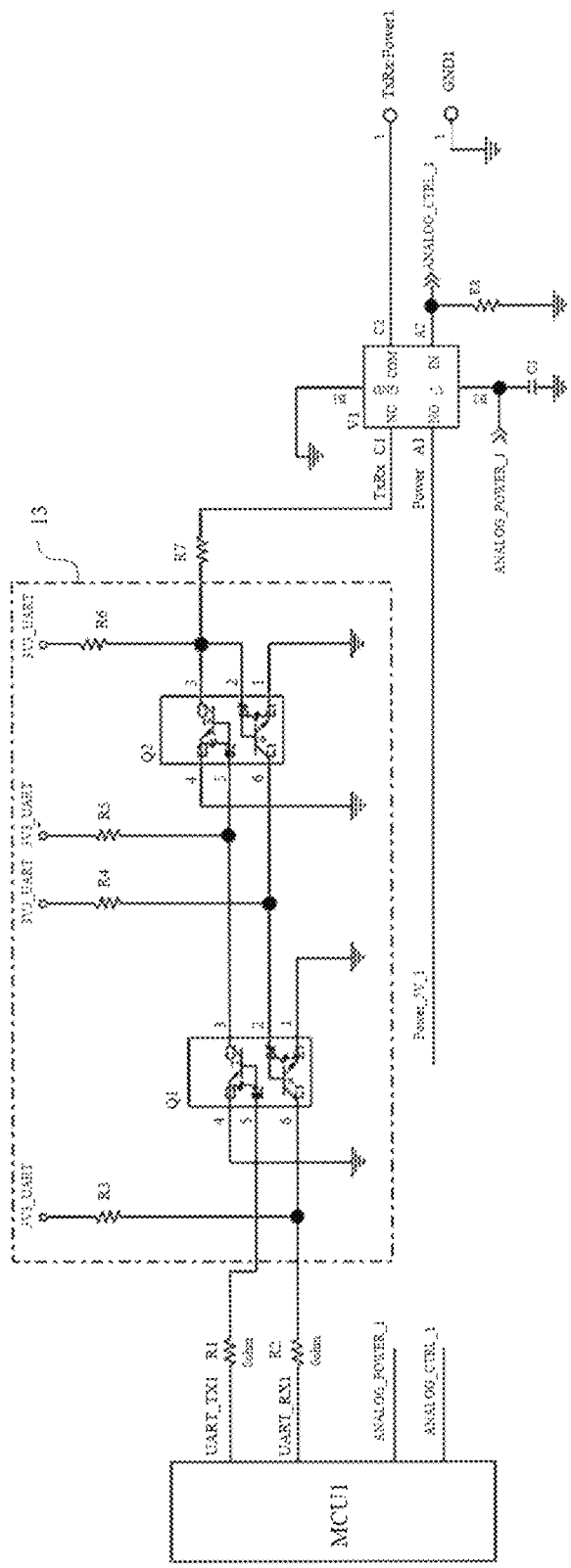
FIG. 6 is a schematic structural diagram of a charging case according to another embodiment of the present disclosure.

In this step, a manner in which the processor in the charging case controls the first single-pole double-throw switch to connect the first power supply pin with the first TxRx and level conversion circuit may be set by the designer. As shown in FIG. 6, a normally closed contact (NC) among two stationary contacts of the first single-pole double-throw switch (U1) is connected with an Rx input terminal and a Tx output terminal of the first TxRx and level conversion circuit. A normally open contact (NO) among the two stationary contacts of the first single-pole double-throw switch (U1) is connected with an output terminal (Power_5V_1) of a power supply circuit. That is, in a default state of the first single-pole double-throw switch, the charging case communicates with the first wireless earphone. In this step, the processor may control the first single-pole double-throw switch to be in the default state.

In step 203, it is determined whether back data or a predetermined end code transmitted by the first wireless earphone through the first power supply pin is received within a predetermined time period. If the back data or the predetermined end code is received within the predetermined time period, step 204 is performed. Otherwise, step 205 is performed.

It should be understood that in this embodiment, after receiving the first to-be-transmitted data completely, the first wireless earphone transmits back data and the predetermined end code to the charging case sequentially if it is required to transmit back data to the charging case, and the first wireless earphone directly transmits the predetermined end code to the charging case if it is not required to transmit back data to the charging case. In this embodiment, it is determined whether the data transmitted by the first wireless earphone can be received by determining whether the back data or the predetermined end code transmitted by the first wireless earphone through the first power supply pin is received within the predetermined time period, so as to determine whether the communication between the charging case and the first wireless earphone is anomalous.

In step 204, the back data and the predetermined end code are received or the predetermined end code is received. After the predetermined end code is received, the first single-pole double-throw switch is controlled to connect the first power supply pin with the power supply circuit to supply power to the first wireless earphone.

In this step, after the predetermined end code is received and the predetermined end code is determined to be valid, the first single-pole double-throw switch is controlled to connect the first power supply pin with the power supply circuit to control the first wireless earphone to switch from communicating with the charging case to being charged by the charging case, so as to supply power to the first wireless earphone.

In step 205, the first single-pole double-throw switch is controlled to connect the first power supply pin and the power supply circuit to supply power to the first wireless earphone.

It should be understood that in this step, in a case that the back data or the predetermined end code transmitted by the first wireless earphone through the first power supply pin is not received within the predetermined time period after the charge case transmits the predetermined end code, that is, in a case that the communication between the charge case and the first wireless earphone is anomalous, the first single-pole double-throw switch is controlled to connect the first power supply pin with the power supply circuit to control the first wireless earphone to switch from communicating with the charging case to being charged by the charging case, so as to supply power to the first wireless earphone.

In an embodiment, step 202 may be performed when communication anomaly is detected for the first time in a current communication. That is, the predetermined start code, the first to-be-transmitted data and the predetermined end code are transmitted again. If the back data or the predetermined end code is still not received within a subsequent predetermined time period, the first single-pole double-throw switch is controlled to connect the first power supply pin with the power supply circuit to supply power to the first wireless earphone.

It is to be noted that in order to realize timely communicate between the charging case and the first wireless earphone, in this embodiment, when the charging case is not required to communicate with the first wireless earphone, the charging case may control the first single-pole double-throw switch to connect the first power supply pin with the first TxRx and level conversion circuit. In addition, the charging case transmits the predetermined start code or transmits the predetermined start code and the predetermined end code to the first wireless earphone through the first power supply pin, so that the first wireless earphone controls, based on the predetermined start code, the first predetermined charging pin and the second TxRx and level conversion circuit to connect with each other, so as to transmit data to the charging case. For example, when the charging case is connected with the first wireless earphone through the first power supply pin and the second power supply pin, the first single-pole double-throw switch may be controlled, at predetermined intervals, to connect the first power supply pin and the first TxRx and level conversion circuit, and the predetermined start code, or the predetermined start code and the predetermined end code, are transmitted to the first wireless earphone through the first power supply pin.

Further, the processor in the charging case in this embodiment may further acquire a reset instruction of the first wireless earphone. The first single-pole double-throw switch is controlled to connect the first power supply pin with the power supply circuit, and the power supply circuit is controlled to output a reset signal, to cause the first wireless earphone to reset based on a voltage signal. For example, the user operates a key on the charging case or operates a terminal (such as a smart phone) connected with the charging case to transmit a reset instruction to the processor in the charging case, to instruct the processor to control the power supply circuit to output a reset signal such as a 5.5 V voltage. In this way, the first wireless earphone is controlled to reset.

In this embodiment of the present disclosure, it is determined whether the back data or the predetermined end code transmitted by the first wireless earphone through the first power supply pin is received within the predetermined time period, so that the charging case can detect whether the communication between the charging case and the first wireless earphone is anomalous, ensuring accuracy of the communication between the wireless earphone and the charging case.

Figure 4:
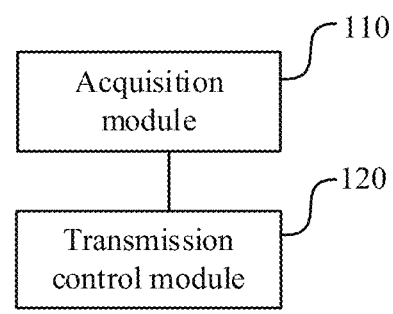
FIG. 4 is a block diagram showing a structure of a communication control device according to an embodiment of the present disclosure.

Referring to FIG. 4, which is a block diagram showing a structure of a communication control device according to an embodiment of the present disclosure, the device includes an acquisition module 110 and a transmission control module 120.

The acquisition module 110 is configured to acquire, when a charging case is connected with a first wireless earphone though a first power supply pin and a second power supply pin, first to-be-transmitted data if the charging case is to communicate with the first wireless earphone.

The transmission control module 120 is configured to control a first single-pole double-throw switch to connect the first power supply pin with a first TxRx and level conversion circuit and sequentially transmit a predetermined start code and the first to-be-transmitted data to the first wireless earphone through the first power supply pin, where the first wireless earphone controls a first predetermined charging pin to be connected with a second TxRx and level conversion circuit based on the predetermined start code, and receives the first to-be-transmitted data, and the first predetermined charging pin is in the first wireless earphone and is connected with the first power supply pin.

In the embodiment of the present disclosure, with the communication control device in which the transmission control module 120 sequentially transmits the predetermined start code and the first to-be-transmitted data, the wireless earphone switches between being charged by the charging case and communicating with charging case. The charging and communication functions between the wireless earphone and the charging case are implemented in a simple and efficient manner based on simple circuits, which reduces development difficulty of the engineer. In addition, no additional communication chip or control device is required, reducing material cost of the product and improving stability and reliability of the product.

Figure 5:
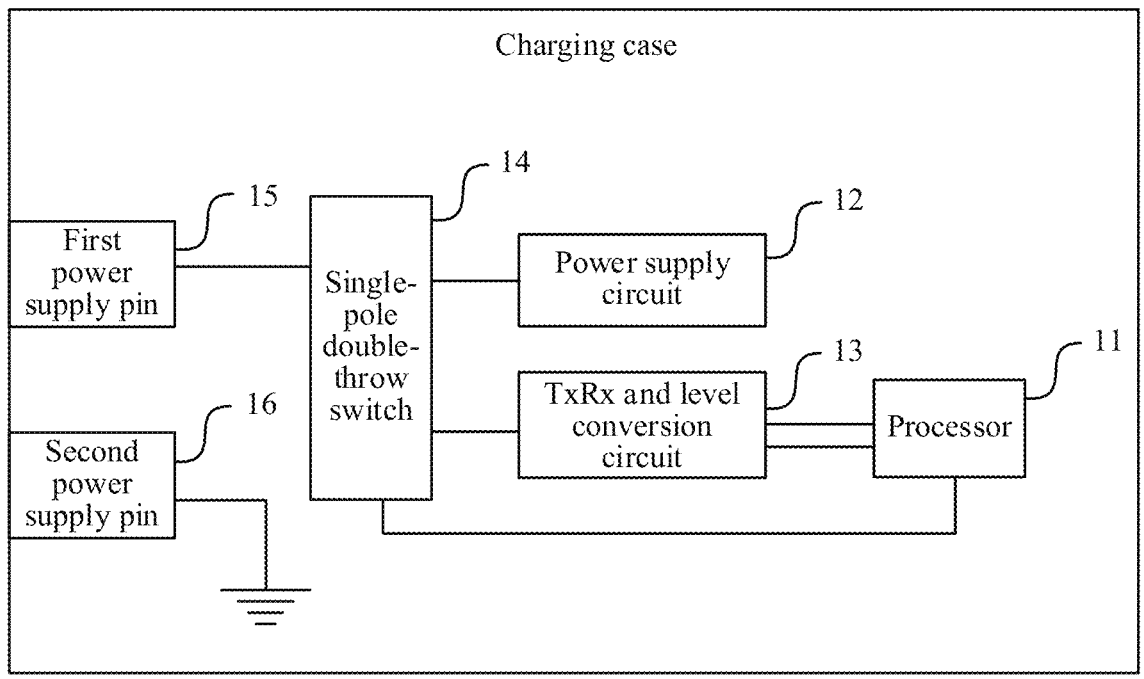
FIG. 5 is a block diagram showing a structure of a charging case according to an embodiment of the present disclosure.

Referring to FIG. 5, which is a block diagram showing a structure of a charging case according to an embodiment of the present disclosure, the charging case includes a processor 11, a power supply circuit 12, a TxRx and level conversion circuit 13, a single-pole double-throw switch 14, a first power supply pin 15 and a second power supply pin 16.

A Tx terminal and an Rx terminal of the processor 11 are respectively connected with a Tx input terminal and an Rx output terminal of the TxRx and level conversion circuit 13, for outputting data and receiving data. A first stationary contact of the single-pole double-throw switch 14 is connected with an output terminal of the power supply circuit 12. A second stationary contact of the single-pole double-throw switch 14 is connected with a Tx output terminal and an Rx input terminal of the TxRx and level conversion circuit 13. A movable contact of the single-pole double-throw switch 14 is connected with the first power supply pin 15. The second power supply pin 16 is grounded. A control terminal of the single-pole double-throw switch 14 is connected with the processor 11, and is configured to control the movable contact to be connected with one of the first stationary contact and the second stationary contact under the control of the processor 11.

It can be understood that in this embodiment, the first power supply pin 15 and the second power supply pin 16 are respectively connected with two charging pins of the wireless earphone. The processor 11 controls switching of the single-pole double-throw switch 14, so that the wireless earphone switches between being charged by the charging case and communicating with the charging case. Therefore, when the charging case is to communicate with the wireless earphone, that is, when the movable contact of the single-pole double-throw switch 14 is connected with the second stationary contact, the wireless earphone is controlled to switch to communicating with the charging case based on transmission of the predetermined start code, realizing communication between the charging case and the wireless earphone.

In this embodiment, the structure of the power supply circuit 12 may be set by the designer. For example, the structure may be set to be the same as or similar to that of the power supply circuit 12 in the conventional technology. As shown in FIG. 2, the power supply circuit may include a power supply (Battery) and a DC-DC boost circuit. The processor 11 (MCU) in the charging case controls the output of the power supply circuit 12 by controlling the DC-DC boost circuit.

The circuit structure of the TxRx and level conversion circuit 13 in this embodiment may be set by the designer. For example, the circuit structure may be set to be the same as or similar to that of the TxRx and level conversion circuit 13 in the conventional technology. As shown in FIG. 6, the TxRx and level conversion circuit 13 may include Q1, Q2 and resistors (R3, R4, R5 and R6). Each of Q1 and Q2 may integrate two triodes or MOS transistors. As long as data outputted from the Tx terminal of the processor 11 can be outputted to the second stationary contact of the single-pole double-throw switch 14 through the Tx input terminal and the Tx output terminal of the TxRx and level conversion circuit 13, and data can be received by the Rx terminal of the processor 11 through the second stationary contact of the single-pole double-throw switch 14, the Rx input terminal and the Rx output terminal of the TxRx and level conversion circuit 13, the structure of the TxRx and level conversion circuit 13 is not limited in this embodiment.

Data transmission and data reception are not limited in this embodiment.

As shown in FIG. 6, the processor 11 (MCU1) outputs a control signal (ANALOG_CTRL_1) to control the control terminal (IN) of the single-pole double-throw switch 14 (U1), to further control the movable contact (COM) of the single-pole double-throw switch 14 to be connected with one of the normally closed stationary contact (NC) and the normally open stationary contact (NO). In order to avoid an uncertain state of the single-pole double-throw switch 14, a pull-down resistor (R8) is provided. The movable contact is connected with the first power supply pin 15 (Tx/Rx/Power1). The normally closed stationary contact is connected with the TxRx and level conversion circuit 13. The normally open stationary contact is connected with the output terminal (Power_5V_1) of the power supply circuit 12. The GPIO (general input/output) of the single-chip microcomputer supplies power (ANALOG_POWER_1) to the single-pole double-throw switch 14, and a decoupling capacitor C1 is provided. 3V3_UART represents the power supply of the charging case. UART_TX1 and UART_RX1 are respectively connected with the Tx terminal and the Rx terminal of the GPIO in the processor 11. Other resistors indicated by R are pull-up resistors and series protection resistors.

It is to be noted that the circuit structure used in a scenario where the charging case communicates with one wireless earphone and charges the one wireless earphone is described in this embodiment. A circuit structure used in a scenario where the charging case communicates with two wireless earphones and charges the two wireless earphones may be set to be similar to that described in this embodiment. For example, the charging case provided in this embodiment may further include another TxRx and level conversion circuit (the third TxRx and level conversion circuit in the above embodiment), another single-pole double throw-switch (the second TxRx and level conversion circuit in the above embodiment), a third power supply pin and a fourth power supply pin, so that the processor 11 controls the another single-pole double-throw switch to connect the another TxRx and level conversion circuit with the third power supply pin, or connect the third power supply pin with the power supply circuit 12 or another power supply circuit, which is not limited in this embodiment.

In the embodiment of the present disclosure, by setting a communication mode and based on simple circuits, the communication and charging functions between the wireless earphone and the charging case are implemented in a simple and efficient manner, which reduces development difficulty of the engineer. In addition, no additional communication chip or control device is required, reducing material cost of the product and improving stability and reliability of the product.

Figure 7:
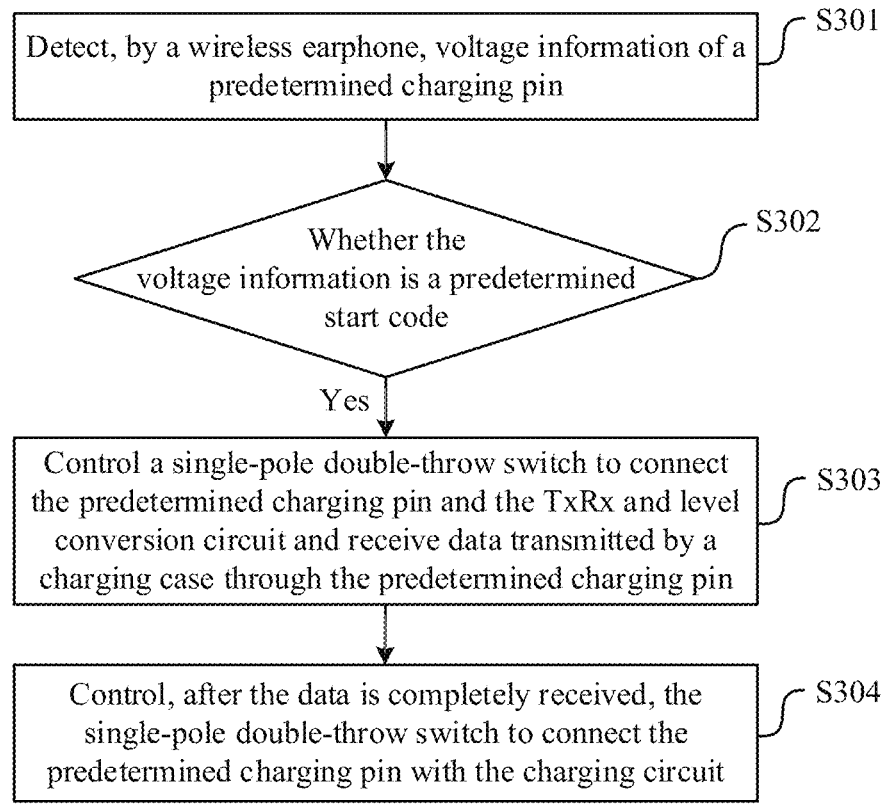
FIG. 7 is a flowchart of a communication control method according to another embodiment of the present disclosure.

Referring to FIG. 7, which is a flowchart of a communication control method according to another embodiment of the present disclosure. The method includes the following steps S301 to S304.

In step S301, a wireless earphone detects voltage information of a predetermined charging pin.

It should be understood that in this step, the wireless earphone determines whether to switch to communicating with a charging case by detecting voltage information of the predetermined charging pin among two charging pins. The predetermined charging pin in this step may be connected with a movable contact of a single-pole-double-throw switch in the wireless earphone, such as Power/TxRx in FIG. 2. When the wireless earphone in this embodiment is placed in the charging case, the predetermined charging pin is connected with a power supply pin (such as the first power supply pin in the above embodiment) in the charging case.

In this embodiment, the processor (such as the BT in FIG. 2) in the wireless earphone may be connected with the predetermined charging pin to detect the voltage information of the predetermined charging pin.

In step 302, it is determined whether the voltage information is a predetermined start code, and step 303 is performed in a case that the voltage information is the predetermined start code.

In this step, the processor in the wireless earphone determines whether to switch to communicating with the charging case, that is, whether to control a single-pole double-throw switch to connect the predetermined charging pin and the TxRx and level conversion circuit, by determining whether the detected voltage information is the preset start code.

An operation performed in a case of determining that the voltage information is not the predetermined start code in this step may be set by the designer. For example, a state of the single-pole double-throw switch may be maintained.

In step 303, the single-pole double-throw switch is controlled to connect the predetermined charging pin and the TxRx and level conversion circuit, and data transmitted by the charging case through the predetermined charging pin is received.

It should be understood that in this step, after detecting the predetermined start code, the processor in the wireless earphone controls the single-pole double-throw switch to connect the predetermined charging pin and the TxRx and level conversion circuit, so that the processor can receive the data transmitted by the charging case, such as the first to-be-transmitted data in the above embodiment, through the TxRx and level conversion circuit.

In this embodiment, in a case that the data transmitted by the charging case to the wireless earphone includes a predetermined end code, the charging case in this embodiment determines whether the data transmitted by the charging case is received within a time period after controlling the single-pole double-throw switch to connect the predetermined charging pin and the TxRx and level conversion circuit. If the data transmitted by the charging case is not received within the time period, communication between the charging case and the wireless earphone is determined to be anomalous, and the single-pole double-throw switch is controlled to connect the predetermined charging pin with the charging circuit.

In step 304, after the data is completely received, the single-pole double-throw switch is controlled to connect the predetermined charging pin with the charging circuit.

It should be understood that in this step, after the wireless earphone completely receives the data transmitted by the charging case, the single-pole double-throw switch is controlled to connect the predetermined charging pin with the charging circuit to cause the wireless earphone to switch from communicating with the charging case to being charged by the charging case.

After receiving the data transmitted by the charging case, the processor in the wireless earphone may directly control the single-pole double-throw switch to connect the predetermined charging pin and the charging circuit, so that the charging case start to charge the wireless earphone. Alternatively, after receiving the data transmitted by the charging case, the processor may determine whether the processor is required to transmit back data to the charging case. If the processor is required to transmit back data to the charging case, the processor may transmit the back data to the charging case through the predetermined charging pin. That is, the wireless earphone may transmit data to the charging case after the charging case finishes transmitting data. For example, after the processor receives a predetermined end code transmitted by the charging case, if back data is required to be transmitted to the charging case, the processor acquires the back data, sequentially transmits the back data and a predetermined end code to the charging case through the predetermined charging pin, and then controls the single-pole double-throw switch to connect the predetermined charging pin with the charging circuit. If no back data is required to be transmitted to the charging case, the processor transmits the predetermined end code to the charging case through the predetermined charging pin, and then controls the single-pole double-throw switch to connect the predetermined charging pin and the charging circuit.

It is to be noted that the processor in the first wireless earphone in this embodiment may directly receive reset data transmitted by the charging case through the predetermined charging pin and the TxRx and level conversion circuit, and perform a reset operation based on the reset data. In order to ensure that the first wireless earphone can reset when the first wireless earphone is turned off, the processor in the first wireless earphone may receive a reset instruction transmitted by a voltage detection chip of the first wireless earphone and perform a reset operation in response to the reset instruction. That is, the first wireless earphone may be provided with a voltage detection chip configured to detect a voltage of the predetermined charging pin. When detecting a reset signal (such as a 5.5 V voltage signal) transmitted by the charging case, the voltage detection chip transmits a reset instruction to the processor in the first wireless earphone, and the processor controls an external DSP (digital signal processors) or other chips in the first wireless earphone to reset.

In the embodiment of the present disclosure, the wireless earphone switches between being charged by the charging case and communicating with charging case by determining the predetermined start code. The charging and communication functions between the wireless earphone and the charging case are implemented in a simple and efficient manner based on simple circuits, which reduces development difficulty of the engineer. In addition, no additional communication chip or control device is required, reducing material cost of the product and improving stability and reliability of the product.

Figure 8:
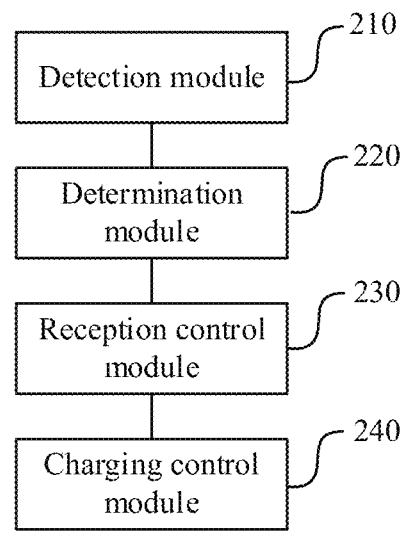
FIG. 8 is a block diagram showing a structure of a communication control device according to another embodiment of the present disclosure.

Referring to FIG. 8, which is a block diagram showing a structure of a communication control device according to another embodiment of the present disclosure. The device includes a detection module 210, a determination module 220, a reception control module 230, and a charging control module 240.

The detection module 210 is configured to detect voltage information of a predetermined charging pin.

The determination module 220 is configured to determine whether the voltage information is a predetermined start code.

The reception control module 230 is configured to, in a case that the voltage information is the predetermined start code, control the single-pole double-throw switch to connect the predetermined charging pin with the TxRx and level conversion circuit and receive data transmitted by the charging case through the predetermined charging pin.

The charging control module 240 is configured to control, after the data is completely received, the single-pole double-throw switch to connect the predetermined charging pin with the charging circuit.

In the embodiment of the present disclosure, the wireless earphone switches between being charged by the charging case and communicating with charging case by determining the predetermined start code by the determination module 220. The charging and communication functions between the wireless earphone and the charging case are implemented in a simple and efficient manner based on simple circuits, which reduces development difficulty of the engineer. In addition, no additional communication chip or control device is required, reducing material cost of the product and improving stability and reliability of the product.

Figure 9:
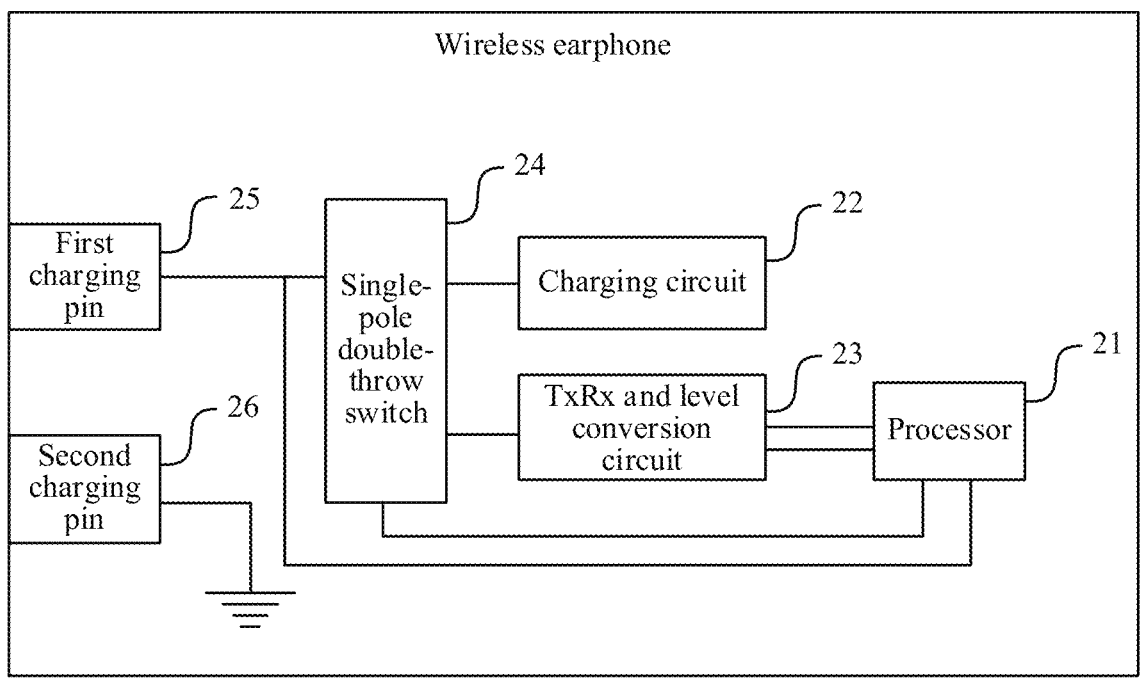
FIG. 9 is a block diagram showing a structure of a wireless earphone according to an embodiment of the present disclosure.

Referring to FIG. 9, which is a block diagram showing a structure of a wireless earphone according to an embodiment of the present disclosure, the wireless earphone includes a processor 21, a charging circuit 22, a TxRx and level conversion circuit 23, a single-pole double-throw switch 24, a first charging pin 25 and a second charging pin 26.

A Tx terminal and an Rx terminal of the processor 21 are respectively connected with a Tx input terminal and an Rx output terminal of the TxRx and level conversion circuit 23, for outputting data and receiving data. A voltage detection terminal of the processor 21 is connected with the first charging pin 25 to detect a voltage of the first charging pin 25. A first stationary contact of the single-pole double-throw switch 24 is connected with an input terminal of the charging circuit 22. A second stationary contact of the single-pole double-throw switch 24 is connected with a Tx output terminal and an Rx input terminal of the TxRx and level conversion circuit 23. A movable contact of the single-pole double-throw switch 24 is connected with the first charging pin 25. The second charging pin 26 is grounded. A control terminal of the single-pole double-throw switch 24 is connected with the processor 21, and is configured to control the movable contact to be connected with one of the first stationary contact and the second stationary contact under the control of the processor 21.

It should be understood that in this embodiment, the first charging pin 25 and the second charging pin 26 are respectively connected with two power supply pins of the wireless earphone placed in the charging case. The processor 21 controls switching of the single-pole double-throw switch 24, so that the wireless earphone switches between being charged by the charging case and communicating with the charging case. When detecting the predetermined start code, the processor 21 controls the single-pole double-throw switch 24 to connect the movable contact with the second stationary contact, that is, the wireless earphone starts to communicate with the charging case, realizing communication between the wireless earphone and the charging case.

In this embodiment, the structure of the charging circuit 22 may be set by the designer. For example, the structure may be set to be the same as or similar to that of the power supply circuit in the conventional technology. As shown in FIG. 2, the charging circuit (charger) 22 in the wireless earphone (the earphone side) may supply power to a battery using power supplied through first charging pin 25 (Power/TxRx) and the single-pole double-throw switch 24.

Figure 10:
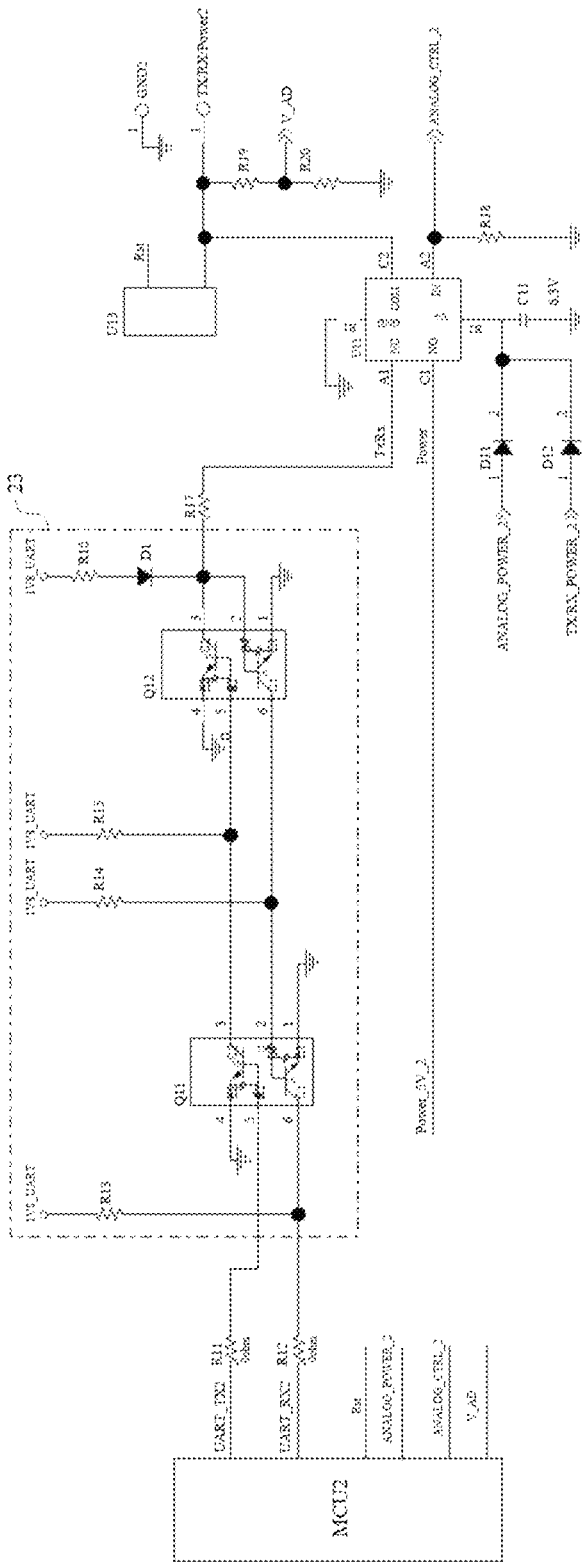
FIG. 10 is a schematic structural diagram of a wireless earphone according to another embodiment of the present disclosure.

The circuit structure of the TxRx and level conversion circuit 23 in this embodiment may be set by the designer. For example, the circuit structure may be set to be the same as or similar to that of the TxRx and level conversion circuit 23 in the conventional technology. As shown in FIG. 10, the TxRx and level conversion circuit 23 may include Q11, Q12 and resistors (R13, R14, R15 and R16). Each of Q11 and Q12 integrates two triodes or MOS transistors. The structure of the TxRx and level conversion circuit 23 is not limited in this embodiment as long as the processor 21 can transmit data and receive data through the TxRx and level conversion circuit 23.

As shown in FIG. 11, the processor 21 (MCU1) outputs a control signal (ANALOG_CTRL_2) to control the control terminal (IN) of the single-pole double-throw switch 24 (U11), to further control the movable contact (COM) of the single-pole double-throw switch 24 to connect with one of the normally closed stationary contact (NC) and the normally open stationary contact (NO) of the single-pole double-throw switch 24. In order to avoid an uncertain state of the single-pole double-throw switch 24, a pull-down resistor (R18) is provided. The movable contact is connected with the first charging pin 25 (Tx/Rx/Power2). The normally closed stationary contact is connected with the TxRx and level conversion circuit 23. The normally open stationary contact is connected with an input terminal (Power_5V_2) of the charging circuit 22. The single-pole double-throw switch 24 may be powered by the GPIO (ANALOG_POWER_2) in the single-chip microcomputer through a Schottky diode D11 and powered by the first charging pin 25 in the charging case through a Schottky diode D12, and a decoupling capacitor C11 is provided. 1V8_UART serves as a power supply of the wireless earphone. UART_TX2 and UART_RX2 are respectively connected with the Tx terminal and the Rx terminal of the GPIO in the processor 21. Furthermore, divider resistors (R19 and R20) are provided to connect the voltage detection terminal of the processor 21 with a voltage division point (V_AD), so as to detect a voltage of the voltage point corresponding to the voltage of the first charging pin 25. D1 represents a protection diode and U13 represents a voltage detection chip. When the voltage of the first charging pin 25 is a reset signal (such as a 5.5 V voltage), a reset instruction (Rst) is inputted to processor 21 to reset the processor 21. Other resistors indicated by R are pull-up resistors and series protection resistors.

In the embodiment of the present disclosure, by setting a communication mode and based on simple circuits, the charging and communication functions between the wireless earphone and the charging case are implemented in a simple and efficient manner, which reduces development difficulty of the engineer. In addition, no additional communication chip or control device is required, reducing material cost of the product and improving stability and reliability of the product.

A communication control system is further provided according to an embodiment of the present disclosure.

The system includes the charging case and the wireless earphone that are described in the above embodiments.

The embodiments in the specification are described in a progressive way, each of which emphasizes the differences from others, and for the same or similar parts among the embodiments, one may refer to description of other embodiments. Since the device disclosed in the embodiments is basically similar to the method therein, the description of the device is relatively simple, and for relevant matters, one may refer to the description of the method embodiments.

It should be further understood by those skilled in the art that units and steps of algorithm described in combination with the disclosed embodiments may be implemented by electronic hardware, computer software or a combination thereof. In order to clearly describe interchangeability of the hardware and the software, components and steps in each example are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

Steps of the method and the algorithm described in combination with the embodiments of the present disclosure may be directly performed by hardware, a software module executed by a processor or a combination thereof. The software module may be stored in a random access memory (RAM), an internal storage, a read-only memory (ROM), an electrically programmable ROM, an electrically erasable programmable ROM, a register, a hard disk, a removable disk, a CD-ROM, and any other form of storage medium known in the art.

The communication control method, the communication control device, the communication control system, the charging case and the wireless earphone according to the present disclosure are described in detail above. Examples are used to explain the principle and the embodiments of the present disclosure, and the above descriptions of the embodiments are only used for helping understand the method and the core idea of the present disclosure. It should be noted that for those skilled in the art, various improvements and modifications may be made to the present disclosure without departing from the principle of the present disclosure, and the improvements and modifications fall within the protection scope of the claims of the present disclosure.

The invention claimed is:

1. A communication control method, comprising:
   acquiring, when a charging case is connected with a first wireless earphone though a first power supply pin and a second power supply pin, first to-be-transmitted data if the charging case is to communicate with the first wireless earphone; and
   controlling a first single-pole double-throw switch to connect the first power supply pin with a first TxRx and level conversion circuit, sequentially transmitting a predetermined start code and the first to-be-transmitted data to the first wireless earphone through the first power supply pin, wherein the first wireless earphone controls a first predetermined charging pin to be connected with a second TxRx and level conversion circuit based on the predetermined start code, and receives the first to-be-transmitted data, the first predetermined charging pin being in the first wireless earphone and being connected with the first power supply pin.

2. The communication control method according to claim 1, wherein the sequentially transmitting a predetermined start code and the first to-be-transmitted data to the first wireless earphone through the first power supply pin comprises:
   sequentially transmitting the predetermined start code, the first to-be-transmitted data and a predetermined end code to the first wireless earphone through the first power supply pin.

3. The communication control method according to claim 1, wherein after the sequentially transmitting a predetermined start code and the first to-be-transmitted data to the first wireless earphone through the first power supply pin, the method further comprises:
   determining whether back data transmitted by the first wireless earphone through the first power supply pin is received within a predetermined time period; and
   controlling, if the back data is not received within the predetermined time period, the first single-pole double-throw switch to connect the first power supply pin with the power supply circuit to supply power to the first wireless earphone.

4. The communication control method according to claim 1, further comprising:
   acquiring a reset instruction for the first wireless earphone; and
   controlling the first single-pole double-throw switch to connect the first power supply pin and the power supply circuit and controlling the power supply circuit to output a reset signal, to cause the first wireless earphone to reset based on a voltage signal.

5. The communication control method according to claim 1, further comprising:
   acquiring, when the charging case is connected with a second wireless earphone though a third power supply pin and a fourth power supply pin, second to-be-transmitted data if the charging case is to communicate with the second wireless earphone; and
   controlling a second single-pole double-throw switch to connect a third power supply pin with a third TxRx and level conversion circuit, sequentially transmitting the predetermined start code and the second to-be-transmitted data to the second wireless earphone through the third power supply pin, wherein the second wireless earphone controls a second predetermined charging pin to be connected with a fourth TxRx and level conversion circuit based on the predetermined start code to receive the second to-be-transmitted data, the second predetermined charging pin being in the second wireless earphone and being connected with the third power supply pin.

6. The communication control method according to claim 1, further comprising:
   when the charging case is connected with the first wireless earphone through the first power supply pin and the second power supply pin:
   controlling, at predetermined intervals, the first single-pole double-throw switch to connect the first power supply pin with the first TxRx and level conversion circuit; and
   transmitting, at the predetermined intervals, the predetermined start code to the first wireless earphone through the first power supply pin.

7. A charging case, comprising a processor, a power supply circuit, a TxRx and level conversion circuit, a single-pole double-throw switch, a first power supply pin and a second power supply pin, wherein:
   a Tx terminal and an Rx terminal of the processor are respectively connected with a Tx input terminal and an Rx output terminal of the TxRx and level conversion circuit, for outputting data and receiving data;
   a first stationary contact of the single-pole double-throw switch is connected with an output terminal of the power supply circuit;
   a second stationary contact of the single-pole double-throw switch is connected with a Tx output terminal and an Rx input terminal of the TxRx and level conversion circuit;
   a movable contact of the single-pole double-throw switch is connected with the first power supply pin, a predetermined start code and first to-be-transmitted data are sequentially transmitted to a first wireless earphone through the first power supply pin;
   the second power supply pin is grounded; and
   a control terminal of the single-pole double-throw switch is connected with the processor, and is configured to control the movable contact to be connected with one of the first stationary contact and the second stationary contact under control of the processor.

8. A communication control system, comprising the charging case according to claim 7 and a wireless earphone, wherein the wireless earphone comprises a processor, a charging circuit, a TxRx and level conversion circuit, a single-pole double-throw switch, a first charging pin and a second charging pin, wherein:
- a Tx terminal and an Rx terminal of the processor are respectively connected with a Tx input terminal and an Rx output terminal of the TxRx and level conversion circuit, for outputting data and receiving data;
- a voltage detection terminal of the processor is connected with the first charging pin to detect a voltage of the first charging pin;
- a first stationary contact of the single-pole double-throw switch is connected with an input terminal of the charging circuit;
- a second stationary contact of the single-pole double-throw switch is connected with an Tx output terminal and an Rx input terminal of the TxRx and level conversion circuit;
- a movable contact of the single-pole double-throw switch is connected with the first charging pin;
- the second charging pin is grounded;
- a control terminal of the single-pole double-throw switch is connected with the processor, and is configured to control the movable contact to be connected with one of the first stationary contact and the second stationary contact under control of the processor.

* * * * *